United States Patent [19]

Wolfrey

[11] 4,314,917

[45] Feb. 9, 1982

[54] HIGH-SOLIDS EPOXY PREPOLYMER COATING COMPOSITION

[75] Inventor: Austin A. Wolfrey, Peabody, Mass.

[73] Assignee: General Electric Company, Schenectady, N.Y.

[21] Appl. No.: 120,861

[22] Filed: Feb. 12, 1980

[51] Int. Cl.$^3$ .............................................. C08L 63/04
[52] U.S. Cl. ........................ 260/18 EP; 260/37 EP; 260/37 AL; 427/386; 528/7; 528/9; 528/89; 528/91; 528/92; 528/103
[58] Field of Search ................. 528/103, 89, 91, 92, 528/7, 9; 260/37 EP, 18 EP, 37 AL, 45, 75 F; 427/386

[56] References Cited

U.S. PATENT DOCUMENTS

| | | | |
|---|---|---|---|
| 3,703,296 | 11/1972 | Malmstrom | 277/25 |
| 3,708,296 | 1/1973 | Schlesinger | 204/159.23 X |
| 3,936,557 | 2/1976 | Watt | 428/211 |
| 3,981,897 | 9/1976 | Crivello | 260/440 |
| 4,026,705 | 5/1977 | Crivello et al. | 204/159.18 X |
| 4,090,936 | 5/1978 | Barton | 204/159.18 |
| 4,117,361 | 9/1978 | Smith et al. | 528/103 X |
| 4,173,551 | 11/1979 | Crivello | 260/18 EP |

*Primary Examiner*—Norman Morgenstern
*Assistant Examiner*—Thurman K. Page
*Attorney, Agent, or Firm*—Hedman, Casella, Gibson & Costigan

[57] ABSTRACT

Novel coating systems comprising high solids content blends of epoxy prepolymers and a catalyst complex comprising a complex iodonium salt, a copper salt, and a tin salt and a conventional pigment. The compositions cure rapidly to highly chemically resistant, tough coatings.

8 Claims, No Drawings

HIGH-SOLIDS EPOXY PREPOLYMER COATING COMPOSITION

BACKGROUND OF THE INVENTION

In Watt, U.S. Pat. No. 3,936,557, are described blends of epoxide materials which, although essentially free of volatile solvents, are liquid and tractable for coating and related applications. The blends comprise epoxy prepolymers of the type glycidyl-bisphenol-A resins, epoxidized novolaks, polyglycidyl ethers, and alicyclic diepoxides, blended with bis(epoxycycloalkyl) esters. The compositions include a cationic polymerization initiator, in particular a radiation sensitive catalyst precursor, such as an aromatic diazonium salt of a complex halogenide. In use, the compositions are coated on a substrate, followed by the application of energy, through heating or through irradiation, to effect substantial polymerization of the epoxidic materials of the coating. A related, relevant disclosure is Schlesinger, U.S. Pat. No. 3,703,296. In Crivello and Schroeter, U.S. Pat. No. 4,026,705, it is disclosed that certain radiation sensitive diaryl iodonium complex salts, such as diphenyliodonium hexafluoroboate, can be incorporated into epoxy resins to produce one package radiation curable compositions. Related teachings are found in Barton, U.S. Pat. No. 4,090,936. Such catalyst systems are more stable than the complex diazonium compounds. In Crivello, U.S. Pat. No. 4,173,551, diaryliodonium salts are disclosed to be effective thermal initiators for polymerization of epoxides, when used in combination with various co-catalysts, such as copper salts. All of the foregoing patents are incorporated herein by reference.

It has now been found possible to formulate epoxide coatings, using such technology if a novel and judicious choice is made of the type of epoxy compound used, the catalyst employed, a solvent-free environment and suitable pigment loadings. With the new coatings, no need of thinner reduction to application viscosity is necessary—application can be made surprisingly easily at solids contents approaching 90 percent by weight. The coatings can be formulated, in general, with any conventional pigment and, if a tin salt is used, unique advantages in terms of room temperature cure rate will result. It is a principal object to provide the finisher with the option to totally eliminate the need for organic solvents. If the finisher still needs a solvent, the composition can still function with less than 10 percent by weight—which is well within Environmental Protection Agency regulations. As mentioned, it is remarkable that all these features are achieved at application viscosity, permitting the finisher to apply extremely heavy films with ease. In addition, as has also been discovered, the embodiments using tin catalyst will cure at room temperature. These unique and versatile coatings depend on the presence in the composition of the epoxide, the complex catalyst, the copper salt co-catalyst and the pigment and such is the subject matter of this invention.

DESCRIPTION OF THE INVENTION

According to the present invention there are provided pigmented, high solids curable compositions comprising (a) an epoxidic prepolymer blend comprising
  (i) a diglycidyl ether of cyclohexanedimethanol
  (ii) a diglycidyl ether of bis-phenol-A;
  (iii) a polyepoxidized phenol or cresol novolak;
  (iv) a polyglycidyl ether of a polyhydric alcohol;
  (v) an epoxidic ester having two epoxycycloalkyl groups; or
  (vi) a mixture of any of the foregoing; and
(b) from 0.5 to 35 parts by weight per 100 parts by weight of (a) and (b) combined of a catalyst comprising
  (i) a diaryliodonium salt of the formula $[(R)_a(R^1)_bI]_c^+[MQ_d]^{-(d-e)}$ 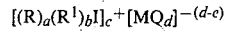

wherein R is a monovalent organic radical, $R^1$ is a divalent aromatic organic radical, M is a metal or metalloid, Q is a halogen radical, a is a whole number equal to 0 or 2, b is a whole number equal to 0 or 1 and the sum of a+b is equal to 2 or the valence of I, c=d−e, e equals the valence of M and is an integer equal to 2–7 inclusive and d>e and is an integer having a value up to 8; and
  (ii) from 0.01 parts to 10 parts, per part of (i), of a copper salt; and
(c) from 10 to 100 parts by weight, per 100 parts by weight of (a) and (b) of a pigment.

In preferred features, there will also be included (d) stannous octoate.

With respect to the ingredients, the diglycidyl ether of cyclohexanedimethanol (a)(i) has the formula:

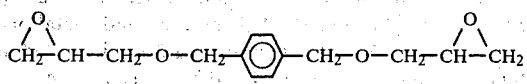

It can be made in conventional ways, e.g., by the reaction of epichlorohydrin with 1,4-cyclohexanedimethanol. It also is commercially available, e.g., from Wilmington Chemical Co., under the tradename Heloxy MK-107.

In preferred blends, components will be, e.g., (a)(ii) the well known reaction product of epichlorohydrin and a diphenolic compound, e.g., bisphenol-A. This is a viscous liquid resin, available from a number of sources, e.g., EPON 828, a product of Shell Chemical Co.;

(a)(iii) a polyepoxidized phenol or cresol novolac, such as the well-known products having average molecular weights in the vicinity of 1000, and epoxy equivalent weights in the range of 160 to 200, frequently about 170–180, and commercially available, e.g., from Dow Chemical Co. under the tradename D.E.N. 438;

(a)(iv) a polyglycidyl ether of a polyhydric alcohol, such as the diglycidyl ether of 1,4-butanediol; the diglycidyl ether of diethylene glycol; the triglicydyl ether of glycerol, and the like. The first-mentioned is commercially available, e.g., from Ciba-Geigy under the tradename Araldite RD-2; or (a)(v) as examples of epoxidic esters having two epoxycycloalkyl groups, there can be mentioned 3,4-epoxycyclohexylmethyl 3,4-epoxycyclohexane carboxylate and bis(3,4-epoxy-6-methylcyclohexylmethyl)adipate, available from Union Carbide Co. under the respective tradenames ERL 4221 and 4289, the former being available as well from Ciba-Geigy under the tradename CY-179. In preferred features, blends of epoxides will comprise from about 15 to 90% by weight of epoxide (a)(i) and about 85 to 10% by weight of one or more of the other enumerated epoxides.

In the diaryliodonium component of the catalyst, radicals embraced by R can be the same or different aromatic carbocyclic radicals having from 6 to 20 carbon atoms, which can be substituted with from 1 to 4 monovalent radicals selected from $C_{(1-8)}$alkoxy, $C_{(1-8)}$ alkyl, nitro, chloro, etc. R is more particularly, phenyl, chlorophenyl, nitrophenyl, methoxyphenyl, pyridyl, etc. Radicals included by $R^1$ are divalent radicals such as

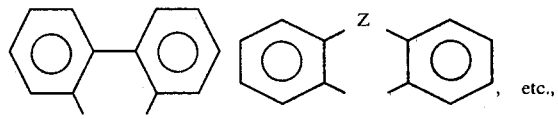

where Z is selected from

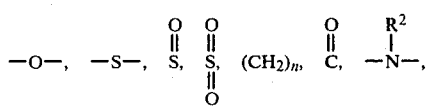

$R^2$ is $C_{(1-8)}$ alkyl or $C_{(6-13)}$ aryl, and n is an integer equal to 1-8 inclusive.

Metals or metalloids included by M of formulas above are transition metals such as Sb, Fe, Sn, Bi, Al, Gaa, In, Ti, Zr, Sc, V, Cr, Mn, Cs, rare earth elements such as the lanthanides, for example, Cd, Pr, Nd, etc. actinides, such as Th, Pa, U, Np, etc., and metalloids, such as B, P, As, etc. Complex anions included by $MQ_d^{-(d-e)}$ are, for example $BR_4^-$, $PF_6^-$, $AsF_6^-$, $SbF_6^-$, $FeCl_4^=$, $SnCl_6^-$, $BiCl_5^=$, etc.

Iodonium salts included by the above formulas are, for example:

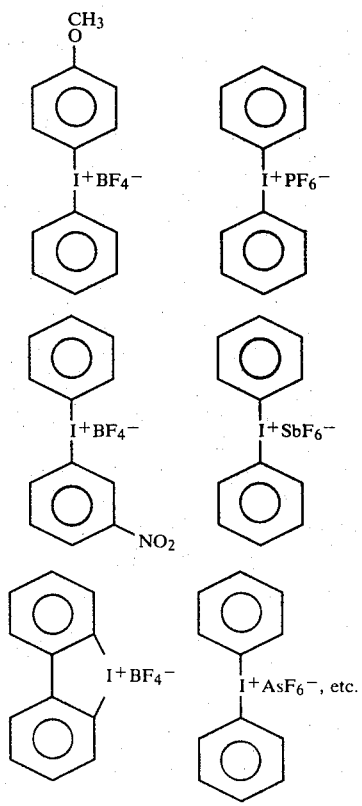

The preferred iodoium salt is diphenyl-iodonium hexafluoroarsenate.

Iodonium salts of the type used herein can be made by the procedure in Crivello, U.S. Pat. No. 3,981,897, incorporated herein by reference, wherein contact between an aryl halonium bisulfate and the corresponding hexafluoro acid or salt can be effected under aqueous conditions.

Copper salts which can be used as component (b)(ii) include, for example, Cu(I) salts such as copper halides, e.g., Cu(I) chloride, etc., Cu(II) salts such as CU(II) benzoate, Cu(II) acetate, Cu(II) stearate, Cu(II) gluconate, Cu(II) citrate, etc. Copper(II) naphthenate is preferred.

Suitable tin salt co-catalysts are stannous salts of carboxylic acids of the formula

where $R^3$ is a monovalent organic radical selected from $C_{(1-18)}$ alkyl and $C_{(6-13)}$ aryl. Illustrative organic acids are acetic acid, 2-ethylhexanoic acid, hexanoic acid, oleic acid, stearic acid, palmitic acid, benzoic acid, salicylic acid, and the like. Preferably the tin salt will be stannous octoate.

The epoxidic resins can be used alone or in combination with reactive diluents, in known ways. For example, such diluents include phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc. Other compounds can also be included, e.g., epoxysiloxane resins, epoxypolymethanes and epoxypolyesters. Other conventional modifiers include amines, carboxylic acids, thiols, phenols, alcohols, etc. Flexibilizers such as hydroxy-terminated polyesters can also be used.

The pigment component (c) can vary widely. Any conventional pigment can be used at conventional levels, e.g., 10-200 parts per 100 parts of composition. Preferably the pigment/binder ratio will be from 1:1 to 1:5 and especially preferably it will be about 1:2. Suitable pigments include titanium dioxide, lamp black, red iron oxide, mixtures thereof, and the like. Titanium dioxide is preferred.

Conventional paint making techniques can be used to make the compositions of this invention. These techniques are well known to those skilled in this art. For example, the pigment, epoxy prepolymer and a very small amount of solvent, e.g., cyclohexanone, can be milled or ground, e.g., in a Cowles mixer to produce a master grind containing, e.g., 55 to 65 wt. % pigment, 25-35 wt. % of epoxidic prepolymer; and a solids content of from about 80 to about 98 wt. %, preferably from 85 to 95 wt. %. Separately, a catalyst solution is prepared from a solvent, e.g., methyl ethyl ketone, the iodonium salt, e.g., diphenyliodonium hexafluoroarsenate, and the copper co-catalyst, e.g., 6% copper naphthanate. Suitable such solutions comprise about 60 to 80wt. % solvent, 2 to 10 wt. % copper salt and 15-40 wt. % of iodonium salt. Then the final composition is formulated by providing formulations with additional epoxide, the master grind, the catalyst solution, and optional stannous salt. The final pigment binder ratio is for example about 1:2 and a useful viscosity is 20 to 60 seconds in a Zahn #2 cup. This can be readily achieved, for example, by blending 50 parts of epoxide, e.g., a cycloaliphatic epoxide, e.g., Union Carbide's ERL-4221, or a BPA-type epoxy, such as Shell Chemicals EPON 828. If stannous octoate is present, the compositions should be freshly prepared because the pot life is generally less than one hour. The pot life can be greatly increased by excluding the stannous octoate.

Conventional coating methods, e.g., brush, spray, dip, flow, etc. can be used. In general, thicknesses of 3-4.0 mils. of paint will give excellent combination of protection, life and economy. The coatings are curable at room temperature, especially if stannous salts are included, and also they are bakeable at elevated temperatures, e.g., for 5 to 20 minutes at 300°-500° C. They are corrosion resistant, flexible and suprisingly resistant to strong solvents, such as methyl ethyl ketone and dimethyl formamide.

DESCRIPTION OF THE PREFERRED EMBODIMENTS

The following examples illustrate the practice of the present invention. The claims should not be limited to them in any manner whatsoever.

EXAMPLE 1

A master grind is prepared in a Cowles mixer from the following:

| Components | Parts by Weight |
| --- | --- |
| bis-glycidyl ether of cyclohexane dimethanol[a] | 887 |
| pigment, titanium dioxide | 260 |
| wetting agent[b] | 10 |
| cyclohexanone | 140 |

[a]Heloxy MK107, Wilmington Chemical Co.
[b]Anti-Terra U, byk-Mallinckrodt Co.

The pigment comprises 57.48 wt. %, epoxy 28.97 wt. %, and the solids content is 86.79 wt. %.

A catalyst solution is prepared from the following:

| Components | Parts by Weight |
| --- | --- |
| methyl ethyl ketone | 74 |
| diphenyliodonium hexafluoro-arsenate | 20 |
| copper naphthanate | 6 |

The following coating composition is prepared:

| Components | Parts by Weight |
| --- | --- |
| bis-glycidyl ether of bisphenol-A and small amount of copper stearate[c] | 50 |
| master grind (above) | 50 |
| xylene | 5 |
| catalyst solution (above) | 1.3 |
| stannous octoate | 1.2 |

[c]General Electric Co. Arnox 3110

The intimate blend has a viscosity of 40 seconds in a Zahn #2 cup, a pigment/binder ratio of 1:2, and a solids content of 88 wt. %.

It is coated onto a cleaned and treated metal panel and cured for 5 minutes at 400° F. The thickness of the coating is 3-4.0 mils., the pencil hardness is 6H; it withstands 200 methyl ethyl ketone rubs; the reverse impact is 5 in.lbs. and after 72 hours of soaking in dimethyl-formamide, there is only a very, very slight softening effect.

EXAMPLE 2

The following coating composition is prepared:

| Components | Parts by Weight |
| --- | --- |
| 3,4-epoxycyclohexylmethyl 3,4-epoxycyclohexane carboxylate[a] | 50 |
| master grind (Example 1) | 50 |
| catalyst solution (Example 1) | 7 |
| stannous octoate | 1.4 |

[a]Union Carbide ERL-4221

The intimate blend has a viscosity of 26 seconds in a Zahn #2 cup, a pigment/binder ratio of 1:2, and a solids content of 88 wt. %.

It is coated onto a cleaned and treated metal panel and cured for 5 minutes at 400° F. The thickness of the coating is 3-4.0 mils., the pencil hardness is 7H; it withstands 200 methyl ethyl ketone rubs; the reverse impact is 0 in. lbs. and after 72 hrs. of soaking in dimethyl formamide there is no adverse effect whatsoever. Example 2 is coated on cold rolled steel (untreated) and cured for 5 minutes at 400° F. This system goes 1200 hours in the 5% salt fog cabinet without blistering or creeping. This is outstanding.

The foregoing examples demonstrate that cycloaliphatic and BPA-type epoxies, pigmented and catalyzed with diaryliodonium complex salts, and copper salts produce extremely useful coatings. These coatings are formulated to be easily applied at solids contents approaching 90% by weight with viscosities less than 40 seconds Zahn #2. These coatings are seen to exhibit great resistance to strong solvents, like methyl ethyl ketone and dimethyl formamide. These coatings also yield basically the same properties when force cured as low as 195° F. or air dry. The degree of cure is directly related to the addition of stannous octoate when curing at low temperatures.

Many variations will suggest themselves to those skilled in this art. All such obvious variations are within the full intended scope of the appended claims.

I claim:

1. A pigmented, high-solids curable composition comprising
   (a) an epoxidic prepolymer blend comprising
      (i) a diglycidyl ether of cyclohexanedimethanol;
      (ii) a diglycidyl ether of Bisphenol A;
      (iii) a polyepoxidized phenol or cresol novolak;
      (iv) a polyglycidyl ether of a polyhydric alcohol;
      (v) an epoxidic ester having two epoxycycloalkyl groups; or
      (vi) a mixture of any of the foregoing; and
   (b) from 0.5 to 35 parts by weight to 100 parts by weight of (a) and (b) combined of a catalyst comprising
      (i) a diaryliodonium salt of the formula

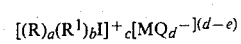

wherein R is a monovalent organic radical, $R^1$ is a divalent aromatic organic radical, M is a metal or metalloid, Q is a halogen radical, a is a whole number equal to 0 or 2, b is a whole number equal to 0 or 1 and the sum of a+b is equal to 2 or the valence of I, c=d−e, e equals the valence of M and is an integer equal to 2–7 inclusive and d > e and is an integer having a value up to 8; and
(ii) from 0.1 part to 10 parts, per part of (i), of a copper salt; and
(iii) from 0.1 part to 10 parts, per part of (i) and (ii) combined, of a tin salt; and
(c) from 10 to 100 parts by weight, per 100 parts by weight of (a) and (b) of a pigment.

2. A composition as defined in claim 1 wherein component (a) comprises a mixture of (i) the diglycidyl ether of cyclohexanedimethanol and (ii) a diglycidyl ether of bisphenol-A.

3. A composition as defined in claim 1 wherein component (a) comprises a mixture of (i) the diglycidyl ether of cyclohexanedimethanol and (v) 3,4-epoxycyclohexylmethyl 3,4-epoxycyclohexane carboxylate.

4. A composition as defined in claim 1 wherein said diaryliodonium salt (b)(i) is diphenyliodonium hexafluoroarsenate.

5. A composition as defined in claim 1 wherein said copper salt (b)(ii) is copper naphthenate.

6. A composition as defined in claim 1 wherein said stannous salt is stannous octoate.

7. A composition as defined in claim 1 wherein said pigment (e) is titanium dioxide.

8. A composition as defined in claim 1 wherein said tin salt is a stannous salt of carboxylic acids of the formula

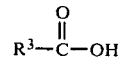

wherein $R^3$ is a monovalent organic radical selected from $C_{1-18}$ alkyl and $C_{6-13}$ aryl.

* * * * *